United States Patent
Mamidisetty et al.

(10) Patent No.: US 10,672,263 B2
(45) Date of Patent: Jun. 2, 2020

(54) MINING VEHICLE MONITORING AND CONTROL SYSTEM

(71) Applicant: The Goodyear Tire & Rubber Company, Akron, OH (US)

(72) Inventors: Kranthi Kumar Mamidisetty, Stow, OH (US); Eric Dennis Matson, Hartville, OH (US); Krithika Prabhu, San Francisco, CA (US); Stephan Caution, Stow, OH (US); Amit Juneja, Pearland, TX (US)

(73) Assignee: The Goodyear Tire & Rubber Company, Akron, OH (US)

( * ) Notice: Subject to any disclaimer, the term of this patent is extended or adjusted under 35 U.S.C. 154(b) by 81 days.

(21) Appl. No.: 15/707,251

(22) Filed: Sep. 18, 2017

(65) Prior Publication Data

US 2018/0082579 A1     Mar. 22, 2018

Related U.S. Application Data

(60) Provisional application No. 62/396,271, filed on Sep. 19, 2016.

(51) Int. Cl.
*G08G 1/01* (2006.01)
*G05D 1/02* (2020.01)
*B60C 23/04* (2006.01)
*B60C 23/06* (2006.01)
(Continued)

(52) U.S. Cl.
CPC .......... *G08G 1/0112* (2013.01); *B60C 11/246* (2013.01); *B60C 23/04* (2013.01); *B60C 23/06* (2013.01); *B60W 50/14* (2013.01); *G05D 1/027* (2013.01); *G05D 1/0231* (2013.01);
(Continued)

(58) Field of Classification Search
CPC ..... G08G 1/0112; B60C 11/246; B60C 23/06; B60W 40/06; G05D 1/0231; G05D 1/027
See application file for complete search history.

(56) References Cited

U.S. PATENT DOCUMENTS 4,407,388 A   10/1983   Steel
6,633,800 B1   10/2003   Ward et al.
6,694,233 B1   2/2004   Duff et al.
(Continued)

OTHER PUBLICATIONS

EPO search report.
Chinese search report dated Sep. 21, 2019.

*Primary Examiner* — Tara Mayo-Pinnock
(74) *Attorney, Agent, or Firm* — Edward T. Kennedy

(57) ABSTRACT

A mining vehicle monitoring and control system includes at least one sensor that is located in the vehicle. The sensor collects real-time data for at least one condition of the vehicle. A server is located remote from the vehicle and a first transmission means transmits the collected data to the server. At least one control parameter is loaded onto the server and a comparison means in the server compares the collected data to the control parameter and generates at least one vehicle condition recommendation based on the comparison. A display device is located in the vehicle and is visible to a driver of the vehicle. A second transmission means transmits the vehicle condition recommendation from the server to the display device. The driver of the vehicle is able to see the vehicle condition recommendation and adjust the operating conditions of the vehicle according to the recommendation.

20 Claims, 4 Drawing Sheets

(51) Int. Cl.
  *B60C 11/24* (2006.01)
  *B60W 50/14* (2020.01)
(52) U.S. Cl.
  CPC ..... *B60W 2300/17* (2013.01); *B60W 2556/45* (2020.02); *Y02T 10/7258* (2013.01)

(56) References Cited

U.S. PATENT DOCUMENTS

| | | |
|---|---|---|
| 7,616,106 B2 | 11/2009 | Shoyama et al. |
| 7,725,232 B2 | 5/2010 | Makela et al. |
| 7,831,345 B2 | 11/2010 | Heino et al. |
| 7,899,584 B2 | 3/2011 | Schricker |
| 7,899,599 B2 | 3/2011 | Makela et al. |
| 8,606,495 B2 | 12/2013 | Makela et al. |
| 8,849,500 B2 | 9/2014 | Gokyu et al. |
| 9,046,371 B2 | 6/2015 | Casson et al. |
| 9,290,180 B2 | 3/2016 | Ichinose et al. |
| 9,441,971 B2 | 9/2016 | Casson et al. |
| 9,594,376 B2 | 3/2017 | Larsson |
| 9,726,016 B2 | 8/2017 | Wilmot et al. |
| 2014/0132422 A1 | 5/2014 | Borland et al. |
| 2014/0244098 A1 | 8/2014 | Ueda et al. |
| 2015/0032373 A1 | 1/2015 | Ikari |
| 2016/0155277 A1 | 6/2016 | Asada et al. |
| 2016/0167446 A1 | 6/2016 | Xu et al. |
| 2016/0258118 A1 | 9/2016 | Jinno et al. |
| 2017/0248439 A1* | 8/2017 | Sakai et al. ............ G01C 21/00 |

\* cited by examiner

MINING VEHICLE MONITORING AND CONTROL SYSTEM

FIELD OF THE INVENTION

The invention relates to mining vehicles. More particularly, the invention relates to driver-operated mining vehicles that transport materials at mining sites. Specifically, the invention is directed to a monitoring and control system that enables the mining vehicle driver to optimize the mining vehicle operating conditions to desirably reduce fuel cost and tire wear.

BACKGROUND OF THE INVENTION

Mining industry operations include quarries, ports and other facilities. In such operations, drivers operate large mining vehicles, such as specialized ultra-class dump trucks, which are capable of carrying raw material payloads that weigh hundreds of tons. For the purpose of convenience, general reference will be made herein to vehicle or mining vehicle with the understanding that such reference includes ultra-class dump-truck type mining vehicles. In a mining operation, the operating cost of such mining vehicles is a significant consideration. Two significant items that contribute to this operating cost are the fuel consumption of the vehicle and tire wear.

Because such large mining vehicles consume tremendous amounts of fuel, it is desirable to operate each vehicle in a manner that reduces fuel consumption. Likewise, because replacement tires for such mining vehicles are expensive, it is desirable to operate each vehicle in a manner that minimizes tire wear. However, in the prior art, it has been difficult at a typical mining operation to operate the mining vehicles in a manner that reduces fuel consumption and minimizes tire wear.

For example, at a typical mining operation, many vehicles are employed to transport mined raw material to a processing area. Due to the constraints of the mining equipment, only one vehicle at a time can be loaded with raw material, which results in vehicles waiting in line to be loaded, as opposed to being constantly moving. During the unloading or dumping operation, similar constraints again result in vehicles waiting in line. To make up for time spent waiting in line, the driver or operator of a vehicle may drive each vehicle rapidly once the vehicle is loaded. Such rapid driving includes increased vehicle acceleration and increased travel speed. Increased acceleration and travel speed in turn undesirably increase fuel cost and tire wear.

It is therefore desirable to provide a sensor-based monitoring and control system for mining vehicles that enables the drivers of such vehicles to optimize vehicle operating conditions based on real-time conditions to desirably reduce fuel cost and tire wear.

SUMMARY OF THE INVENTION

According to an aspect of an exemplary embodiment of the invention, a mining vehicle monitoring and control system includes at least one sensor that is located in the vehicle. The sensor collects real-time data for at least one condition of the vehicle. A server is located remote from the vehicle and a first transmission means transmits the collected data to the server. At least one control parameter is loaded onto the server and a comparison means in the server compares the collected data to the control parameter and generates at least one vehicle condition recommendation based upon the comparison. A display device is located in the vehicle and is visible to a driver of the vehicle. A second transmission means transmits the vehicle condition recommendation from the server to the display device.

According to an aspect of another exemplary embodiment of the invention, a method for controlling a mining vehicle includes the step of collecting real-time data for at least one condition of the vehicle with at least one sensor disposed in the vehicle. The collected data is transmitted to a server that is remote from the vehicle. At least one control parameter is loaded onto the server and the control parameter is compared to the collected data. At least one vehicle condition recommendation is generated based on the comparison. The vehicle condition recommendation is transmitted to a display device disposed in the vehicle and the vehicle condition recommendation is displayed to a driver of the vehicle on the display device.

BRIEF DESCRIPTION OF THE DRAWINGS

The invention will be described by way of example and with reference to the accompanying drawings, in which.

Similar numerals refer to similar parts throughout the drawings.

DETAILED DESCRIPTION OF THE INVENTION

Figure 1:
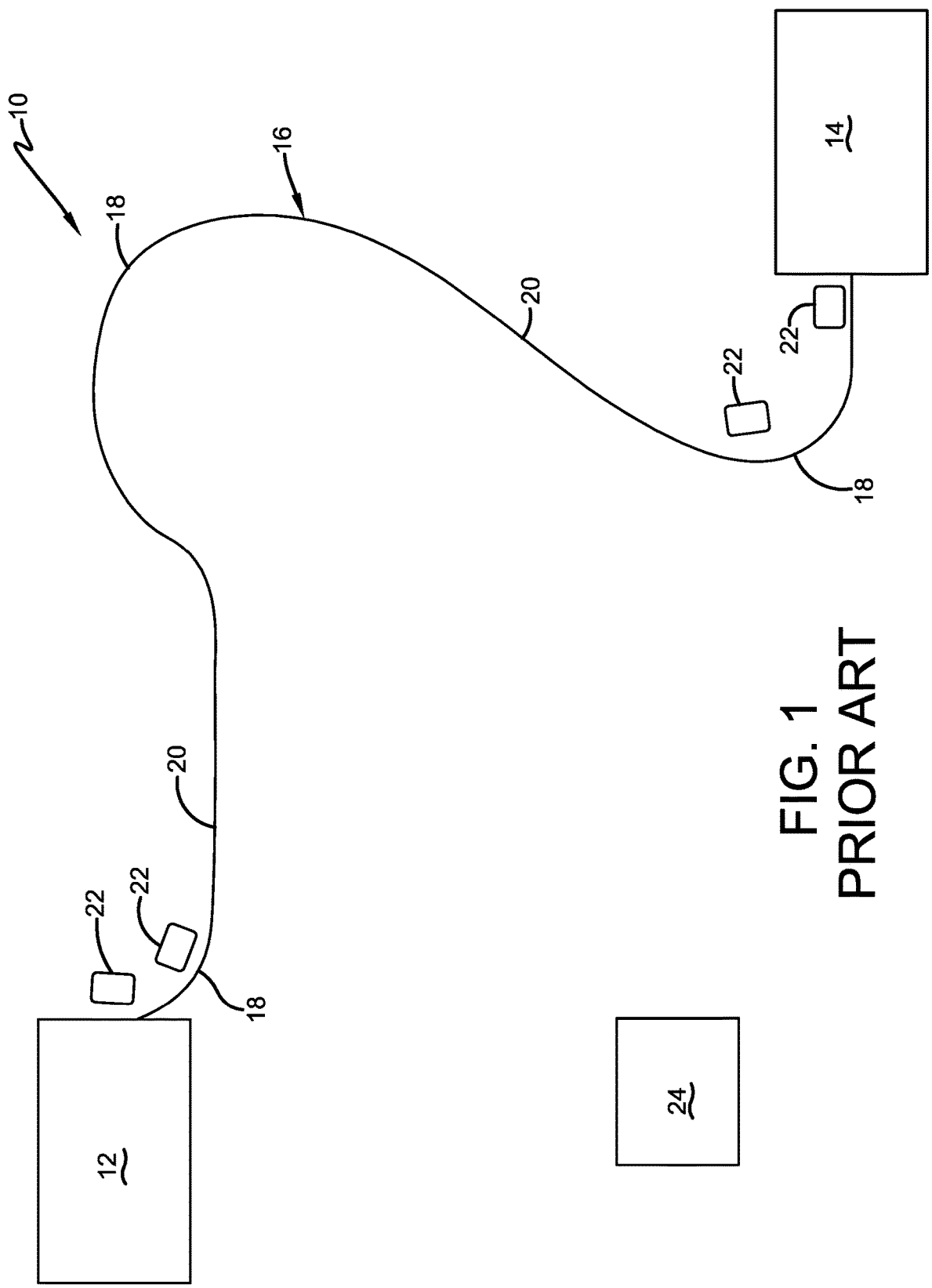
FIG. 1 is a schematic representation of a mining site showing vehicles under prior art conditions.

Turning to FIG. 1, a mining site is represented schematically at 10. The mining site 10 includes a pit or loading area 12, a hopper or unloading/dumping area 14 and a mine road 16 extending between the pit and the hopper. The mine road 16 typically includes several curves or turns 18 and straight areas 20. Multiple mining vehicles 22 transport raw material from the pit 12 to the hopper 14 along the road 16. In the prior art, it has been common for the vehicles 22 to line up and wait to be loaded at the pit 12 and to line up and wait to dump at the hopper 14. Because of such waiting, the vehicle drivers often drive each vehicle 22 rapidly along the road 16, which undesirably increases fuel cost and tire wear.

Figure 2:
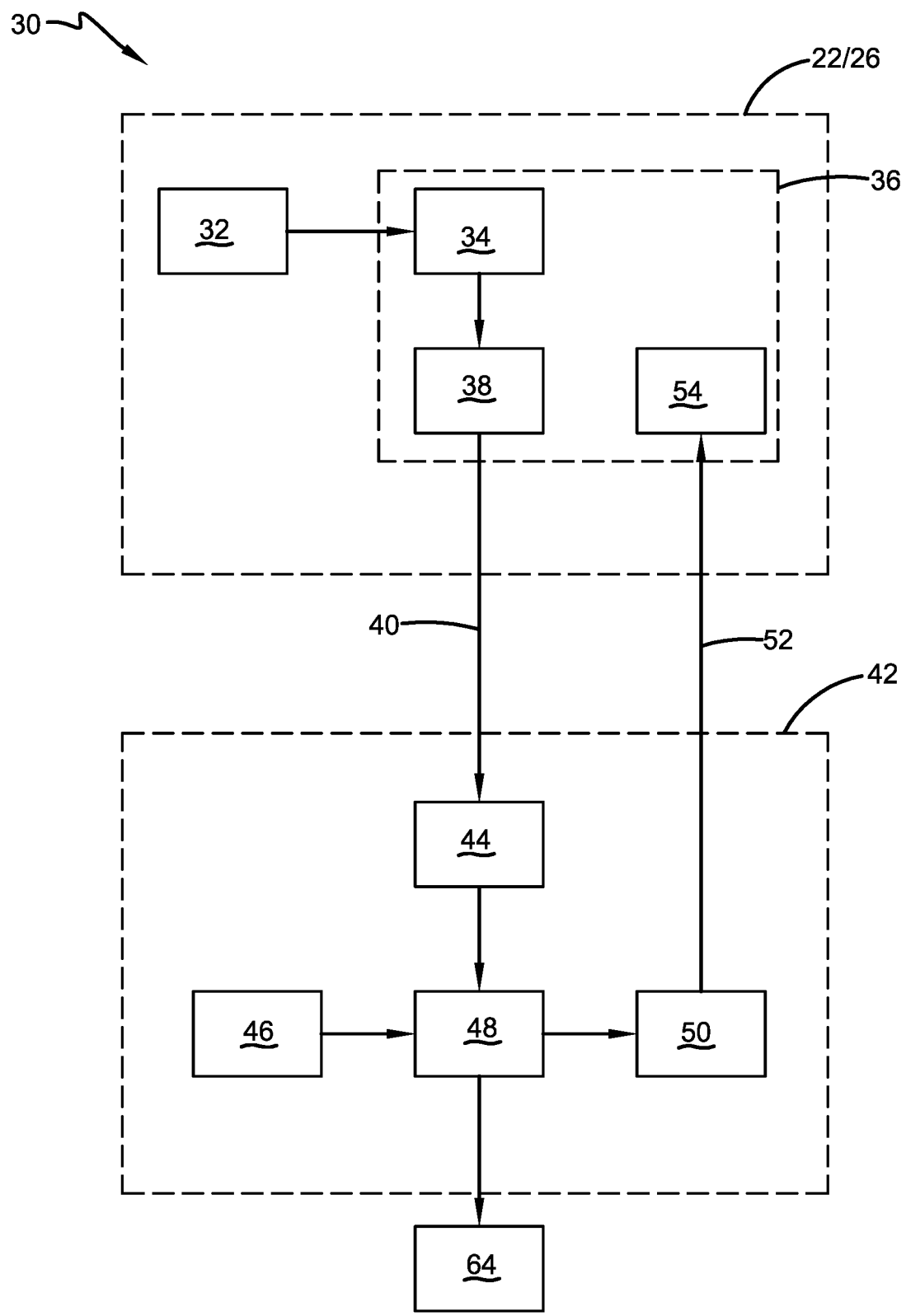
FIG. 2 is a schematic representation of an exemplary embodiment of the mining vehicle monitoring and control system of the present invention.

Turning now to FIG. 2, an exemplary embodiment of a mining vehicle monitoring and control system of the present invention is indicated generally at 30. The monitoring and control system 30 includes sensors 34 that preferably are located in a cab 26 of the vehicle 22. Exemplary sensors 34 include global positioning system (GPS) units, fuel consumption sensors, speed indicators, and other sensors that measure vehicle operating conditions. The sensors 34 collect real-time data on the conditions 32 of the vehicle 22.

For example, the conditions 32 may include the location of the vehicle 22 along the road 16 (FIG. 1), the speed of the vehicle, the acceleration of the vehicle and the fuel level of the vehicle. The sensors 34 collect the selected vehicle conditions 32 and the conditions are sent to an in-vehicle processor 38. The sensors 34 and the in-vehicle processor 38 are integrated into an in-vehicle module 36 of the monitoring and control system 30. The sensors 34 are electronically connected to the in-vehicle processor 38, thereby enabling the collected data to be sent from the sensors to the processor.

The in-vehicle processor 38 then transmits the collected data to a server 42 by wireless electronic transmission means 40, such as infrared transmission, radio waves and the like, including cellular data transmission. The server 42 includes data collection means 44, such as a hard drive or other data storage unit. The data collection means 44 is electronically connected to a processor 48 that executes a comparison between the actual vehicle conditions 32 and pre-loaded control parameters 46.

The pre-loaded control parameters 46 are determined in advance and are loaded onto the server. For example, the pre-loaded control parameters 46 may include a map of the mine road 16, topology of the road and the surrounding area, the distance along the road, the number of vehicles 22 operating at the mining site 10, and the like. The processor 48 determines optimized vehicle conditions based upon the control parameters 46 to promote uniform vehicle spacing, fuel efficiency and reduced tire wear. Such optimized vehicle conditions include the ideal route along the mine road 16 to be used and the optimum vehicle acceleration and speed at selected points along the mine road.

The processor 48 compares the collected real-time vehicle condition data 32 to the optimized vehicle conditions and generates a set of recommendations 50. The recommendations 50 include adjustments to specific real-time vehicle conditions that do not match the corresponding optimized vehicle conditions, as will be described below. If the real-time vehicle conditions match the corresponding optimized vehicle conditions, the recommendations 50 may include instructions to continue or hold the current conditions. The recommendations 50 are transmitted to a display device 54 in the cab 26 of the vehicle 22 by wireless electronic transmission means 52, such as infrared transmission, radio waves and the like, including cellular data transmission. Preferably, the display device 54 is incorporated into the in-vehicle module 36. The driver is able to see the recommendations 50 on the display device 54 and adjust the vehicle operating conditions in real time to match the optimized conditions and thus reduce fuel consumption and tire wear.

Figure 3:
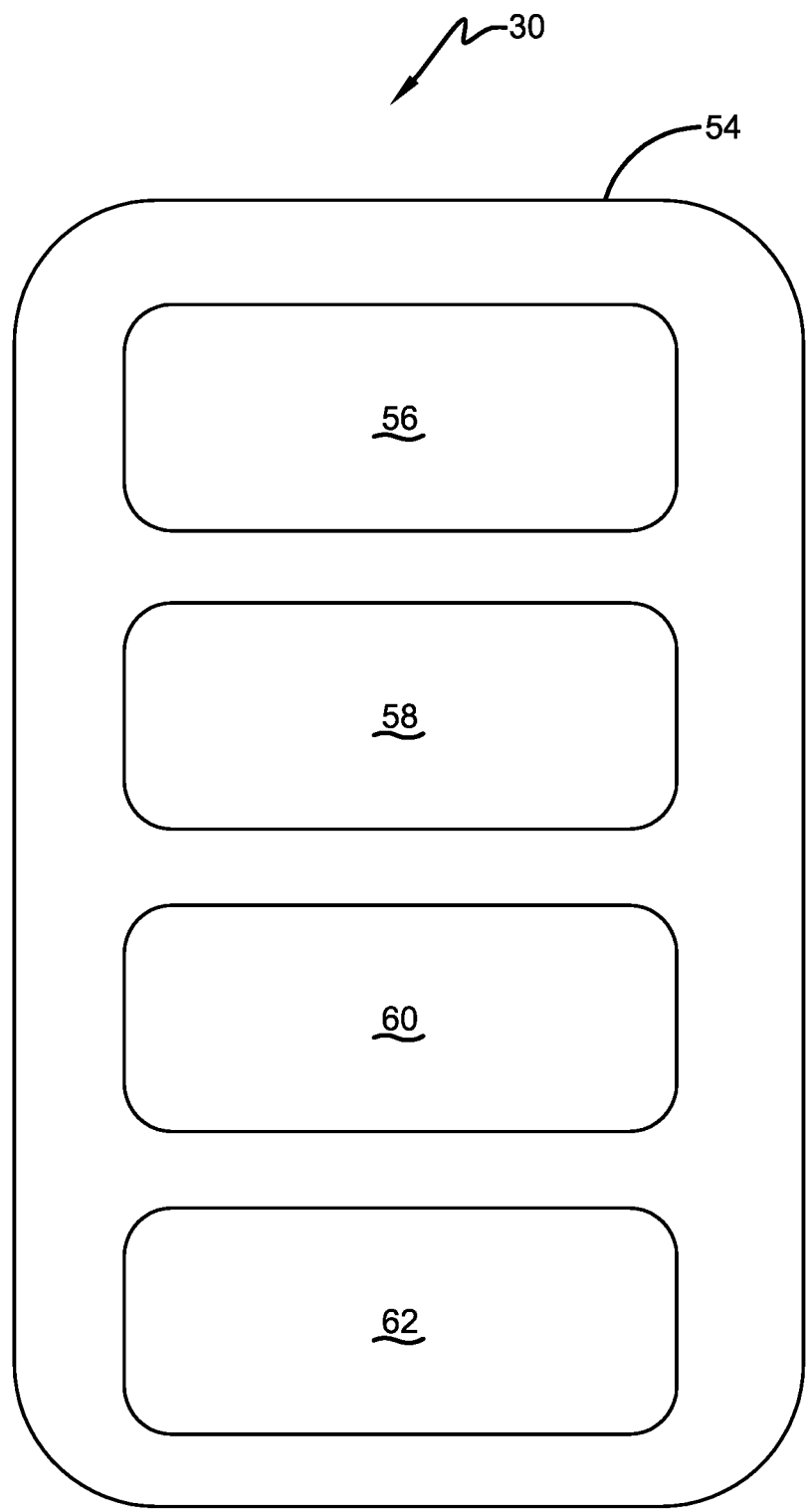
FIG. 3 is a schematic representation of a display device of the system shown in FIG. 2.

Turning to FIG. 3, a schematic representation of an exemplary display device 54 is shown. The display device 54 displays the recommendations 50 in a predetermined format that is configured based upon considerations for each specific mining site 10. For example, the display device 54 may show recommended acceleration or deceleration 56 for fuel efficiency and reduced tire wear, the location 58 of other vehicles 22 so that optimum vehicle spacing may be maintained, a route map with any route issues 60, and other information or recommendations 62. Specific aspects of the recommended acceleration or deceleration 56, also referred to as driver scoring, the location 58 of other vehicles 22 for optimum spacing, also referred to as a virtual bumper, and the route map with any route issues 60, also referred to as pothole detection, will be described in greater detail below.

Figure 4:
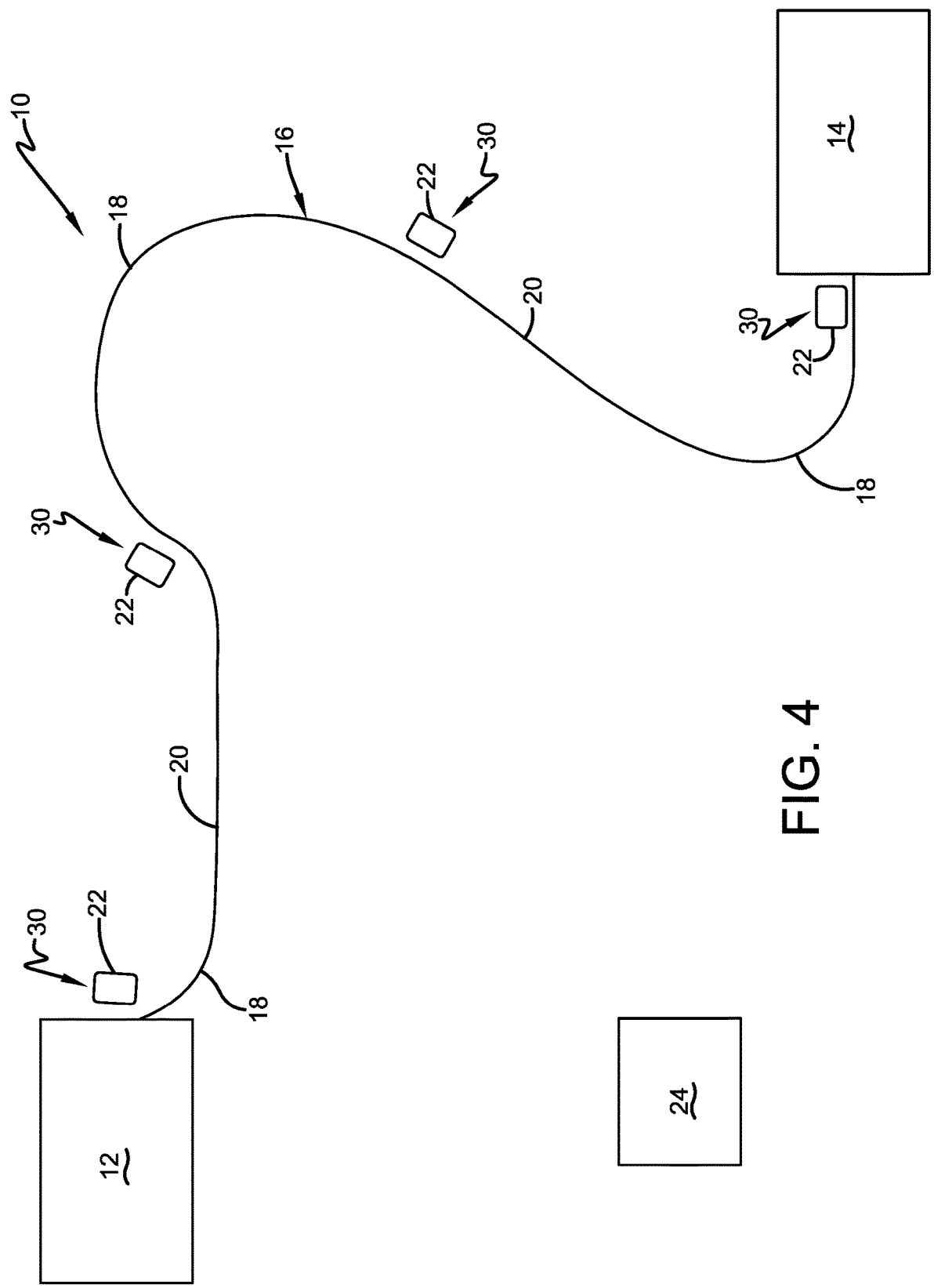
FIG. 4 is a schematic representation of a mining site showing vehicles under conditions employing the system shown in FIG. 2.

When the driver sees the recommendations on the display device 54, the driver can adjust his or her operation of the vehicle 22 according to the recommendations to optimize vehicle performance. For example, the driver may increase or decrease the vehicle speed, adjust the route of the vehicle, or adjust his or her frequency of vehicle braking. As shown in FIG. 4, such live feedback to the vehicle driver enables adjustment of the vehicle conditions to provide optimum spacing along the mine road 16. Such uniform spacing reduces vehicle over-acceleration, which in turn reduces fuel consumption and tire wear. The monitoring and control system of the invention 30 thus provides live feedback to drivers of the heavy-duty vehicles 22 to enable real-time control of vehicle conditions to optimize production time, reduce fuel cost and reduce tire wear.

Returning to FIG. 2, in addition to the processor 48 immediately generating recommendations 50 for transmission to the driver display device 54, the processor may store the comparison of the collected real-time data of the vehicle conditions 32 to the optimized vehicle conditions for later analysis 64. With such later analysis 64, a manager of the mining site 10 can evaluate the collected vehicle data 32 for each one of a group of vehicles 22 to review driver performance, as well as to review and potentially adjust the control parameters 46. The later analysis may enable further adjustments to the recommended vehicle operating conditions and thus provide additional optimization of production time, reduction of fuel cost and reduction of tire wear.

With reference to FIGS. 2-4, as mentioned above, the recommended acceleration or deceleration 56 that is displayed to the vehicle driver is also referred to as driver scoring. As shown in FIG. 4, the mine road 16 includes curves 18 and straight sections 20. These aspects of the mine road 16 are input into the processor 48 in advance as control parameters 46. The processor 48 then determines a vehicle speed and acceleration at each specific curve 18 and straight section 20 that optimizes fuel consumption and tire wear, which are generated as recommendations 50. The particular recommendations of vehicle acceleration or deceleration 56 along each portion of the mine road 16 are transmitted in real time to the vehicle driver and are displayed on the display device 54.

For example, an optimum speed along a straight section 20 may be about 28 miles per hour, and the driver may only be operating the vehicle at 19 miles per hour. Based upon the driver scoring 56, the display device 54 will indicate that the driver should increase the vehicle speed from 19 miles per hour to 28 miles per hour. Likewise, an optimum speed on a curve 18 may be about 10 miles per hour, and the driver may be operating the vehicle at 18 miles per hour. Based upon the driver scoring 56, the display device 54 will indicate that the driver should decrease the vehicle speed from 18 miles per hour to 10 miles per hour.

The driver scoring 56 for vehicle acceleration and deceleration can also be stored for later analysis 64. For example, the actual vehicle speed can be compared to the optimum vehicle speed as a benchmark at specific points along the mine road 16. In a three-month trial of the driver scoring 56 of the monitoring and control system 30, providing vehicle drivers a comparison of the actual vehicle speed to optimum benchmark speeds yielded a reduction of fuel consumption of about eight percent (8%) and an improvement of tire life of about fifteen percent (15%).

The location 58 of other vehicles 22 for optimum spacing that is displayed to the vehicle driver is also referred to as a virtual bumper. As described above, in the prior art (FIG. 1), the vehicles 22 may cluster together in certain areas along the mine road 16, which results in an undesirable queue that reduces production time and leads to subsequent over-acceleration which increases fuel consumption and tire wear. In order to reduce such queuing, the virtual bumper 58 provides instructions to the driver that enables optimum spacing between the vehicles to be maintained, as shown in FIG. 4.

More particularly, the location of each vehicle 22 along the mine road 16 is one of the collected vehicle conditions 32 of the monitoring and control system 30. Based upon the distance of the mine road 16 and the number of vehicles 22, which are input as control parameters 46, the processor 48 calculates optimum vehicle spacing, which is generated as a recommendation 50. The particular recommendation of the location of a specific vehicle 22 relative to other vehicles is transmitted in real time to the vehicle driver and displayed on the display device 54 as the virtual bumper 58. Such real-time information to a driver of the location of his or her vehicle 22 relative to other vehicles in the virtual bumper 58 enables the drivers to maintain optimum spacing between the vehicles, which reduces queuing and idling time. Such a reduction of queuing and idling time reduces subsequent over-acceleration, thereby reducing fuel consumption and tire wear.

The display of a route map with any issues 60 is also referred to as pothole detection. In a mining site 10, large equipment and raw materials are being moved, resulting in obstacles often appearing along the mine road 16. In addition, the mine road 16 is typically formed of earth and/or gravel, which enables large potholes to form from the traffic along the road. Frequent repair and/or regrading of the mine road 16 is costly, so it is often more economical to route the vehicles around the hazards of obstacles and potholes rather than constantly repair the road.

To this end, one of the control parameters 46 that is input into processor 48 is the location of hazards, such as an obstacle or pothole, along the mine road 16. The processor 48 adjusts the routing of the vehicles 22 based upon the hazard location and generates an alert or routing adjustment as a recommendation 50. The particular recommendation of the location of the hazard and the re-routing instructions are transmitted in real time to the vehicle driver and displayed on the display device 54 as the pothole detection 60. Such real-time information to a driver of the location of a hazard and rerouting instructions in the pothole detection 60 enables the drivers to avoid hazards. By avoiding such hazards, the performance of the tires and/or vehicle suspension is maintained without the expense of constant repair of the mine road 16. In addition, by avoiding such hazards, tire wear is desirably reduced.

Another aspect of the monitoring and control system 30 of the present invention is an optional speed limiting feature. For a mining vehicle 22, it may be physically difficult for a driver to maintain a consistent vehicle speed for a long period of time, even though such a consistent speed may provide optimum performance. In order to assist the driver, the monitoring and control system 30 may include a speed limiting device, such as an electronic throttle control, which responds to the vehicle speed recommendations 56. Alternatively, the speed limiting device may be a mechanical throttle control that is employed when a consistent speed is recommended by the display device 54 for a relatively long period of time. For example, the mechanical speed limiting device may include a foot rest adjacent the throttle or pedal that is at the same elevation as the desired position of the throttle to achieve the recommended speed, which provides a physical benchmark for the driver and enables relief of pressure on the driver's leg. The mechanical speed limiting device may alternatively include an adjustment screw below the throttle or pedal that provides a positive stop which limits the travel of the throttle.

In this manner, the mining vehicle monitoring and control system 30 of the present invention enables the driver of the mining vehicle 22 to optimize the mining vehicle operating conditions based on real-time information to desirably optimize production time, reduce fuel cost and reduce tire wear.

In addition, the system 30 provides for later analysis 64 to enable further adjustments to the operating conditions of the vehicle 22 and provide additional optimization of production time, reduction of fuel cost and reduction of tire wear.

The present invention also includes a method of monitoring a mining vehicle and a method of controlling a mining vehicle. Each method includes steps in accordance with the description that is presented above and shown in FIGS. 2-4.

It is to be understood that the structure of the above-described mining vehicle monitoring and control system may be altered or rearranged, or components or steps known to those skilled in the art omitted or added, without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A mining vehicle monitoring and control system, comprising:
   at least one sensor being located in a driver-operated mining vehicle, wherein the at least one sensor collects real-time data for at least one condition of the vehicle;
   a server being located remote from the vehicle;
   a first transmission means for transmitting the collected data to the server;
   at least one control parameter being loaded onto the server;
   an optimized vehicle condition determined based on the at least one control parameter;
   a comparison means in the server for comparing the collected real-time vehicle condition data to the optimized vehicle condition and for generating at least one real-time vehicle condition recommendation to the driver based upon the comparison, wherein the at least one vehicle condition recommendation includes:
      when the collected real-time vehicle condition data matches the optimized vehicle condition, instructions in real time to the driver to hold current vehicle conditions; and
      when the collected real-time vehicle condition data does not match the optimized vehicle condition, instructions in real time to the driver to adjust a selected real-time vehicle condition;
   a display device being located in the vehicle and visible to the driver; and
   a second transmission means for transmitting the at least one vehicle condition recommendation from the server to the display device to enable the driver to hold or adjust operating conditions of the vehicle in real time.

2. The mining vehicle monitoring and control system of claim 1, wherein the at least one sensor includes at least one of a global positioning system unit, a fuel consumption sensor and a speed indicator.

3. The mining vehicle monitoring and control system of claim 1, wherein the at least one condition of the vehicle includes at least one of a location of the vehicle, a speed of the vehicle, an acceleration of the vehicle and a fuel level of the vehicle.

4. The mining vehicle monitoring and control system of claim 1, wherein the first transmission means and the second transmission means each include wireless electronic transmission.

5. The mining vehicle monitoring and control system of claim 1, wherein the comparison means includes an electronic processor that executes a comparison between the collected data and the at least one control parameter.

6. The mining vehicle monitoring and control system of claim 1, wherein the at least one control parameter includes at least one of a map of a mine road, a topology of a mine road, a distance along a mine road and a number of vehicles operating at a mining site.

7. The mining vehicle monitoring and control system of claim 1, wherein the server stores the collected data and the at least one control parameter for later analysis.

8. The mining vehicle monitoring and control system of claim 1, wherein the at least one vehicle condition recommendation includes at least one of a recommended vehicle acceleration, recommended vehicle deceleration, and a route map.

9. The mining vehicle monitoring and control system of claim 8, wherein the at least one of a recommended vehicle acceleration and a recommended vehicle deceleration correspond to selected features of a mine road.

10. The mining vehicle monitoring and control system of claim 8, wherein the route map includes at least one of a display of a location of a hazard and re-routing instructions.

11. The mining vehicle monitoring and control system of claim 1, wherein the at least one vehicle condition recommendation includes a location of other vehicles and optimum vehicle spacing to reduce a vehicle queuing time.

12. The mining vehicle monitoring and control system of claim 1, further comprising a speed limiting feature.

13. A method for controlling a mining vehicle, the method comprising the steps of:
   collecting real-time data for at least one condition of a driver-operated mining vehicle with at least one sensor disposed in the vehicle;
   transmitting the collected data to a server that is remote from the vehicle;
   loading at least one control parameter onto the server;
   determining an optimized vehicle condition based on the at least one control parameter;
   comparing the collected real-time vehicle condition data to the optimized vehicle condition;
   generating at least one real-time vehicle condition recommendation to the driver based on the comparison, wherein the at least one vehicle condition recommendation includes:
      when the collected real-time vehicle condition data matches the optimized vehicle condition, instructions in real time to the driver to hold current vehicle conditions; and
      when the collected real-time vehicle condition data does not match the optimized vehicle condition, instructions in real time to the driver to adjust a selected real-time vehicle condition;
   transmitting the at least one vehicle condition recommendation to a display device disposed in the vehicle; and
   displaying the at least one vehicle condition recommendation for the driver on the display device to enable the driver to hold or adjust operating conditions of the vehicle in real time.

14. The method for controlling a mining vehicle of claim 13, wherein the step of collecting real-time data includes disposing at least one of a global positioning system unit, a fuel consumption sensor and a speed indicator in the vehicle.

15. The method for controlling a mining vehicle of claim 13, wherein the step of collecting real-time data includes collecting at least one of a location of the vehicle, a speed of the vehicle, an acceleration of the vehicle and a fuel level of the vehicle.

16. The method for controlling a mining vehicle of claim 13, wherein the step of transmitting the collected data to the server and the step of transmitting the at least one vehicle condition recommendation to the display device each include wireless electronic transmission.

17. The method for controlling a mining vehicle of claim 13, wherein the step of comparing the at least one control parameter to the collected data includes employing an electronic processor.

18. The method for controlling a mining vehicle of claim 13, wherein the step of comparing the at least one control parameter to the collected data includes a control parameter comprising at least one of a map of a mine road, a topology of a mine road, a distance along a mine road and a number of vehicles operating at a mining site.

19. The method for controlling a mining vehicle of claim 13, further comprising the step of storing the collected data and the at least one control parameter for later analysis.

20. The method for controlling a mining vehicle of claim 13, wherein the step of generating at least one vehicle condition recommendation includes at least one of a recommended vehicle acceleration, recommended vehicle deceleration, a location of other vehicles and a route map.

* * * * *